Aug. 27, 1968   J. V. FREDD   3,398,928
VALVES
Filed March 11, 1966   3 Sheets-Sheet 1
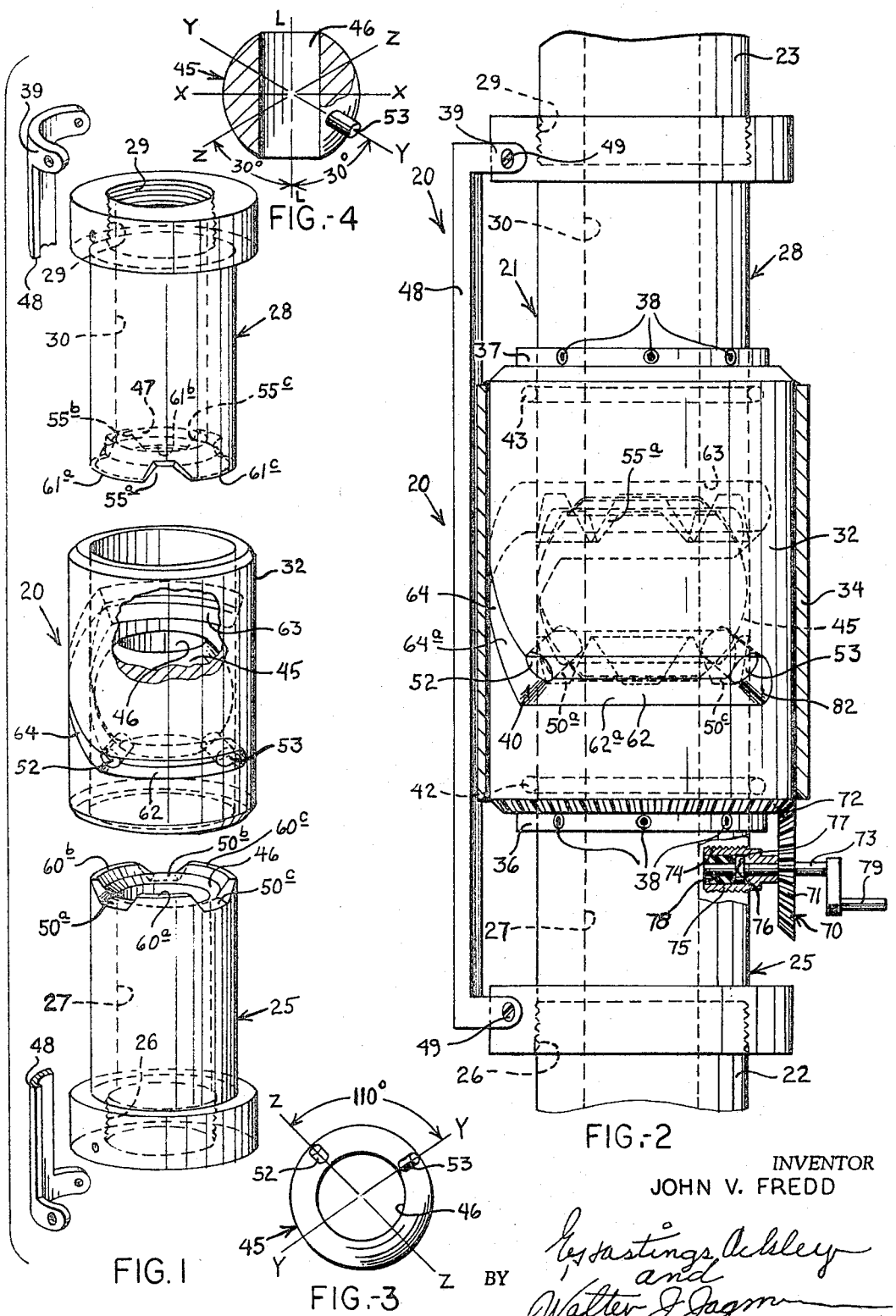
INVENTOR
JOHN V. FREDD
ATTORNEYS

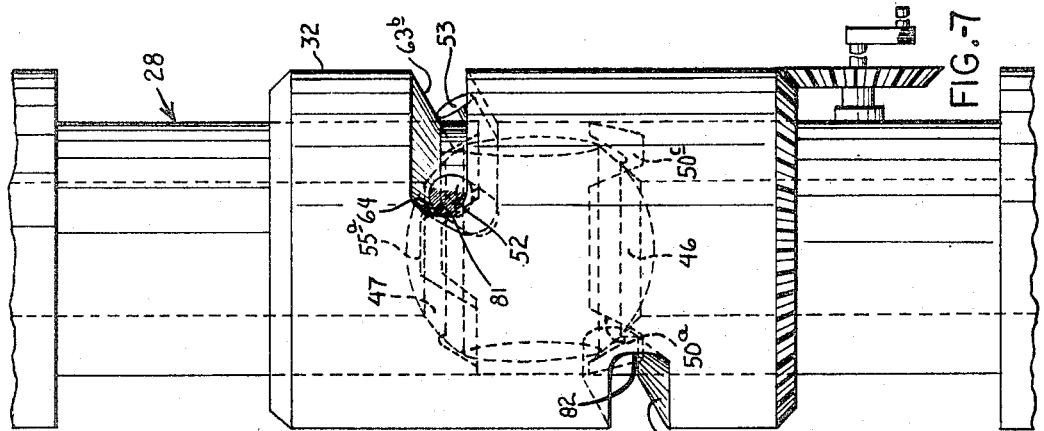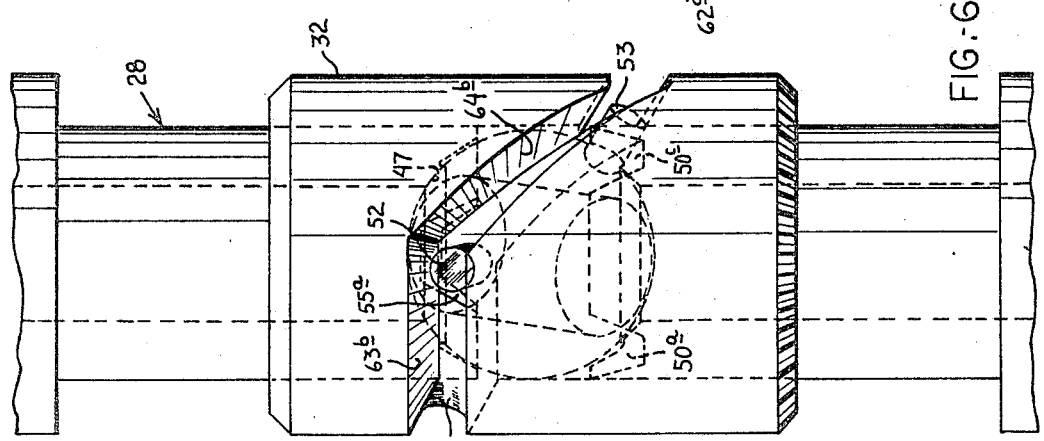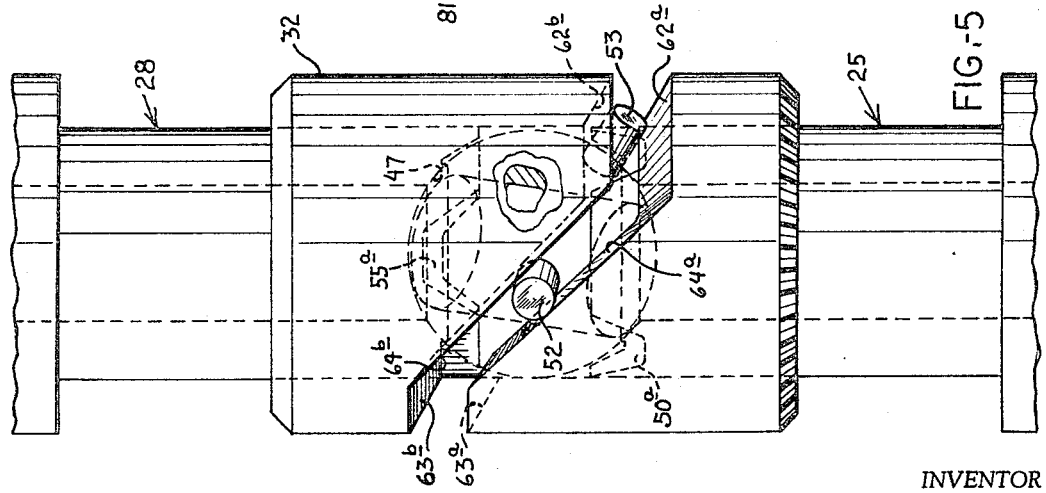

Aug. 27, 1968

J. V. FREDD 3,398,928

VALVES

Filed March 11, 1966

INVENTOR
JOHN V. FREDD

BY *Hastings Ackley and Walter J. Jagmin*

ATTORNEY

United States Patent Office 3,398,928
Patented Aug. 27, 1968

3,398,928
VALVES
John V. Fredd, Dallas, Tex., assignor to Otis Engineering Corporation, Dallas, Tex., a corporation of Delaware
Continuation-in-part of application Ser. No. 499,478, Oct. 21, 1965. This application Mar. 11, 1966, Ser. No. 533,667
16 Claims. (Cl. 251—251)

This invention relates to valves and more particularly to valves having a rotatable ball for opening and closing the valve.

This application is a continuation-in-part of my co-pending application, Ser. No. 499,478, filed Oct. 21, 1965.

An object of this invention is to provide a new and improved valve which is easily movable between its open and closed positions.

Another object is to provide a valve having a ball provided with an axial passage and operator means associated with the ball for rotating the ball about more than one radial axis thereof during its movement between open and closed positions in order to minimize the force required to rotate the ball.

Still another object is to provide a valve having a pair of tubular seat members, a ball provided with an axial passage rotatable between the seat members, and operator means engageable with the ball for rotating the ball between open and closed positions.

A further object is to provide a valve wherein the operator means includes rotatable means for rotating the ball between its open and closed positions without imparting longitudinal movement to the ball.

A still further object is to provide a valve wherein the operator means for rotating the ball includes means rotatable about the longitudinal axis of the flow passage of the valve and engageable with the ball at circumferentially spaced locations thereof for causing the ball during its movement between its closed and open positions to rotate about a first central axis of the ball extending through one of such locations and then about a second central axis extending at an angle to the first axis and through another of such locations.

Another object is to provide a valve having longitudinally spaced tubular members, a ball having an axial passage rotatably disposed between the seat members, and operator means which includes a cam sleeve provided with a cam slot, cam and actuator pins of the ball which extend radially outwardly of the ball into the cam slot, the engagement of the actuator pins with the surfaces of the cam sleeve defining its slot during the rotation of the cam sleeve causing rotation of the ball between its open and closed positions.

Another object is to provide a valve having a pair of tubular seat members and a ball provided with an axial passage rotatably disposed between the seat members, the seat members and the ball having coengageable means for rotating the ball about more than one axis upon rotation of one of the seat members relative to the other.

Still another object is to provide a valve wherein the ball is rotatated about a plurality of axes which are moving during the movement of the ball between its open and closed positions.

Additional objects and advantages of the invention will be readily apparent from the reading of the following description of a device constructed in accordance with the invention, and reference to the accompanying drawings thereof, wherein:

FIGURE 1 is an exploded perspective view of a valve embodying the invention;

FIGURE 2 is a vertical view with some parts broken away of the valve illustrated in FIGURE 1 showing the valve in its open position;

FIGURE 3 is an end view of a ball of the valve illustrated in FIGURES 1 and 2;

FIGURE 4 is a vertical partly sectional view of the ball;

FIGURE 5 is a vertical view of the valve illustrated in FIGURES 1 and 2 with some parts thereof removed showing the valve at the first stage of the movement of its ball from its open toward its closed position;

FIGURE 6 is a view similar to FIGURE 5 showing the valve at a subsequent stage of the movement of its ball toward its closed position;

FIGURE 7 is a view similar to FIGURE 5 showing the ball of its valve in its closed position;

Figure 8:
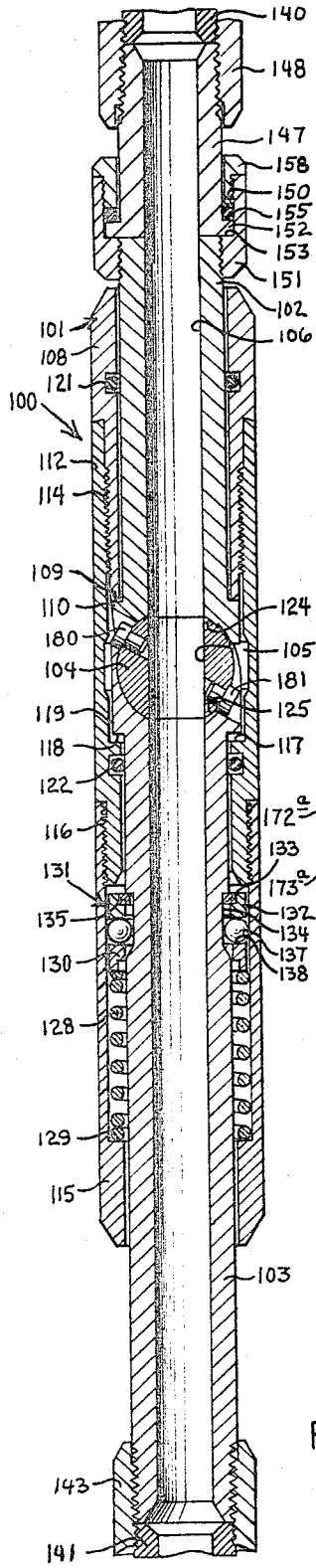
FIGURE 8 is a vertical sectional view of another form of the valve embodying the invention.

Referring now to FIGURES 1 through 7 of the drawing, the valve 20 embodying the invention includes an elongate tubular housing 21 connectable between and to adjacent sections 22 and 23 of a flow conductor to constitute a section thereof. The housing comprises a tubular bottom seat member 25 in the enlarged lower end portion 26 of whose longitudinal passage 27 is threaded the upper end portion of the lower flow conductor section 22, a top tubular seat member 28 in the enlarged upper end portion 29 of whose longitudinal passage 30 is threaded the upper flow conductor section 23, a tubular cam sleeve 32 into whose opposite ends telescope adjacent end portions of the seat members, and a closure sleeve 34 which is disposed about the cam sleeve and may be rigidly secured thereto in seal-tight relation therewith in any suitable manner. For example, the closure sleeve may be secured to the cam sleeve by welding. A pair of lock collars 36 and 37 rigidly secured to the seat members 25 and 28, respectively, by set screws 38 limit longitudinal movement of the cam sleeve relative to the seat members.

The cam sleeve has a cam slot 40 and internal annular recesses below and above the cam slot in which are disposed O-rings 42 and 43 which seal between the cam sleeve and the bottom and top seat members 25 and 28, respectively. A ball 45, which has an axial flow passage 46, is rotatably disposed between the facing internal annular seat surfaces 46 and 47 of the housing seat members 25 and 28, respectively. The two seat members are held against rotation relative to one another by an arcuate connector bar 48 rigidly secured to the two seat members by screws 49.

The bottom seat member has three circumferentially spaced upwardly opening recesses 50a, 50b and 50c at its upper end in two of which are positioned the cam or actuator pins 52 and 53 of the ball 45 when the ball is in its open position illustrated in FIGURES 1 and 4. The top seat member similarly has three circumferentially spaced downwardly opening recesses 55a, 55b and 55c at its lower end in two of which are positioned the ball actuator pins when the ball is in its closed position illustrated in FIGURE 7.

The recesses 55a, 55b and 55c of the top seat are spaced above and in vertical alignment with the arcuate top surfaces 60a, 60b and 60c, respectively, of the bottom seat member which extend between its recesses. The recesses 50a, 50b and 50c are spaced below and in vertical alignment with the similar bottom arcuate surfaces 61a, 61b, and 61c, respectively, of the top seat member 28.

The cam slot 40 has vertically spaced bottom and top horizontal portions 62 and 63 and a middle portion 64 which inclines at an angle of approximately 45 degrees to the vertical to connect the two horizontal portions. The length of each of the portions of the cam slot is equal to or slightly greater than the spacing between the cam lugs 52 and 53 so that when the valve is in its open position, the actuator pins extend into the bottom portion of the cam slot and when the valve is in its closed position illustrated in FIGURE 7, the two cam pins extend into the top portion of the cam slot. The bottom and top surfaces 62a and 62b of the cam sleeve which define the bottom portion of the cam slot incline outwardly and downwardly at an angle of approximately 60 degrees to the axis L—L of the ball and the bottom and top surfaces 63a and 63b which define the top portion of the cam slot similarly incline upwardly and outwardly at an angle of approximately 60 degrees to the axis L—L. The lower and upper inclined surfaces 64a and 64b defining the middle portion 64 of the slot 40 extend at an angle of approximately 45 degrees relative to the axis L—L.

The actuator pins extend radially outwardly from suitable bores of the ball in which their inner ends are threaded. The axes of the actuator pins are spaced substantially 110 degrees about and intersect the central axis L—L of the axial passage of the ball and lie in a plane which intersects the mutually perpendicular axes L—L and X—X of the ball at the center of the ball so that the pins when the ball is in its open position, are below the central axis X—X of the ball. The cam sleeve is rotatable through approximately 180 degrees about the longitudinal axis of the valve by means of a bevel gear 70 whose teeth 71 mesh with the gear teeth 72 milled in the lower end of the cam sleeve. The shaft 73 on which the gear is fixedly mounted has inner end portions held rotatably in a bore 74 of the bottom seat member by a tubular retainer 75 threaded into the bore, the internal shoulder 76 of the retainer engaging the external flange 77 of the gear shaft. A bearing 78 is interposed between the inner end portion of gear shaft and the retainer. The shaft 73 has a crank handle 79.

In use, assuming that fluid is flowing upwardly from the lower flow conductor section 22 to the upper flow conductor section 23 through the valve, the valve being in its open position illustrated in FIGURE 4, and the pins 52 and 53 are disposed in the recesses 50a and 50c, respectively, and it is desired to stop such flow, the cam sleeve 32 is rotated, by means of the crank handle 79 and the gear 70, in a counter-clockwise direction as seen from above. The ball remains stationary until the actuator pin 52 is engaged by the lower surface 64a of the cam sleeve defining the lower side of the middle portion 64 of the slot. The camming engagement of the surface 64a, with the pin as such rotation of the cam sleeve is continued causes upward movement of the pin 52 about the radial axis Y—Y of the ball coincident with the axis of the pin 53 since movement of the pin 53 is now prevented due to its engagement with the surfaces of the bottom seat member defining the recess 50c and with the surface 62a of the cam sleeve. As the pin 52 is thus moved upwardly and to the right and in a clockwise direction as seen in FIGURE 4, about the axis of the pin 53 toward the downwardly opening recess 55a of the top seat member 28, the ball is rotated about the axis Y—Y in a clockwise direction as seen in FIGURE 4, and the axial passage 46 moves out of alignment with the passages of the seat members. The cam sleeve, as its rotation is continued moves the ball about the axis Y—Y until the cam sleeve moves to such position that the actuator pin 52 moves into the inner end of the top horizontal portion 63 of the cam slot and into the recess 55a. At this time the ball has been rotated through approximately 67 degrees about a central axis Y—Y of the ball which is coincident with the axis of the pin 53 from the position illustrated in FIGURE 4 and is in the position illustrated in FIGURE 6. The axial passage 46 of the ball, which has been rotated in a clockwise manner about the axis Y—Y is still in communication with the passages of the seat members and the pin 53 is in alignment with the lower end of the middle portion 64 of the cam slot. As the rotation of the cam sleeve is continued, the surface 64a of the cam sleeve engages the pin 53 and the ball is now rotated approximately 67 degrees about a central axis Z—Z thereof which extends at an angle of approximately 110 degrees relative to the axis Y—Y and which is also coincident with the axis of the pin 52. The movement of the pin 52 is now arrested due to its engagement with the surface of the top seat member defining a side of the recess 55a and with the cam sleeve surface 63b. During the portion of rotation of the cam sleeve during which the pin 53 is moved upwardly and in a counter-clockwise direction, as seen in FIGURE 6, about the axis Z—Z, the axial passage 46 of the ball is moved out of alignment with the passages of the two seat members. Further rotation of the cam sleeve is then arrested due to the engagement of the pin 52 with the surface 81 of the cam sleeve defining one end of the slot 40 and the pins 52 and 53 with the surfaces of the top seat member defining the right sides of the recesses 55a and 55c, respectively. At this time the ball is in the position illustrated in FIGURE 7 with its axial passage out of communication with the passages of the seat members and with the upwardly acting pressure differential across the ball holding the outer surface of the ball in sealing engagement with the seat surface 47 of the top seat member. The valve is now closed.

It will thus be seen that as a result of the rotation of the ball approximately 67 degrees about a first central axis Y—Y thereof and then approximately 67 degrees about a second central axis Z—Z, the ball is displaced 90 degrees from its position illustrated in FIGURE 4 to its position illustrated in FIGURE 7.

If it is thereafter again desired to open the valve, the cam sleeve is rotated by means of the gear 70 in a clockwise manner, as seen from above, from the position illustrated in FIGURE 7, back to the position illustrated in FIGURE 4, and the reverse sequence of movements of the pins and ball takes place. As the cam sleeve is rotated from the position illustrated in FIGURE 7 to the position illustrated in FIGURE 6, the surface 64b of the cam sleeve engages the pin 53 and moves it downwardly, the ball pivoting about the central axis Z—Z in a clockwise direction as seen in FIGURE 7, the pin 52 being held against downward movement until the pin 53 is moved to its lower position at inner end of the bottom horizontal portion 62 of the slot and is disposed in the recess 50c of the bottom seat member. Thereafter, the top surface 64b of the cam sleeve engages the pin 52 and rotates the ball about the central axis Y—Y thereof, the pin 53 being now held against movement, until the surface 82 defining the other end of the cam slot 40 engages the pin 53. The pin 52 is then disposed in the recess 50a of the bottom seat member and further rotation of the cam sleeve is arrested since the pins then engage the surfaces of the bottom seat member defining the left sides of the recesses 50a and 50c.

It will be seen that only two of the recesses of each of the seat members are employed but both seat members have been provided with three recesses to facilitate assembly of the valve.

It will now be apparent that a new and improved valve has been illustrated and described which includes a ball having an axial passage and operator means which includes a rotatable member, such as the cam sleeve 32, and the actuator pins 52 and 53 of the ball for rotating the ball first about central axis thereof through approximately 67 degrees and then through approximately 67 degrees about a second axis of the ball which extends at an angle of approximately 110 degrees relative to the first axis, the two axes lying in a plane which extends at an angle of approximately 30 degrees to the central axis L—L of the axial passage 46 of the ball, to displace the ball 90 degrees between two positions, in one of which the axial passage of the ball permits flow through the valve and in the other of which the ball prevents passage of fluids through the valve.

Referring now particularly to FIGURES 8 through 16 of the drawings, the valve 100 embodying the invention includes a housing 101, top and bottom seat members 102 and 103 which are telescoped into opposite ends of the housing and a ball 104 having an axial passage 105 disposed in the housing between the adjacent ends of the two seat members which communicates with the passages 106 and 107 of the seat members to permit flow through the valve when the ball is in its open position illustrated. The housing includes a top section 108 whose bottom end engages the upwardly facing annular shoulder 109 of the external flange 110 of the top seat member to limit downward movement of the housing relative to a middle section 112 whose upper end is threaded, as at 114, on the lower reduced end portion of the top housing section, and a bottom housing section 115 whose upper end is threaded, as at 116, on the reduced lower end portion of the middle housing section. Upward movement of the housing relative to the seat members is limited by the engagement of the internal upwardly facing annular shoulder 117 of the middle housing section with the downwardly facing shoulder 118 of the top external annular flange 119 of the bottom seat member. The top and middle housing sections are provided with internal annular recesses in which are disposed O-rings 121 and 122 which seal with the top and bottom seat members, respectively. The top and bottom seat members have facing seat surfaces 124 and 125, respectively, which engage the outer surface of the ball.

The bottom seat member is biased upwardly relative to the housing and toward the ball 104 by a spring 128 disposed about the bottom seat member whose lower end portion bears against the upwardly facing internal annular shoulder 129 of the bottom housing section and whose upper end bears against a ring 130 of a bearing assembly 131. The bearing assembly includes an upper ring 132 provided with an upwardly opening internal recess in which are disposed the outer portions of a split ring 133. The inner portions of the split ring extend into the external annular recess 134 of the bottom seat member and its top surface engages the downwardly facing annular shoulder 135 of the bottom seat member which defines the top end of the recess 134. A plurality of balls 137 are interposed between the two rings of the bearing assembly. Preferably the bottom ring 130 has a downwardly and inwardly sloping top end surface 138 whereby the balls tend to be cammed inwardly into the external recess of the bottom seat member. The bearing assembly facilitates relative movement between the housing and the bottom seat member especially when forces are exerted on the bottom seat member which tend to move the bottom seat member out of vertical axial alignment with the housing.

The valve is connectable between adjacent ends of the sections 140 and 141 of a flow conductor to constitute a section thereof, one of the seat members being rigidly secured to one of the flow conductor sections and the other seat member is rotationally secured to the other flow conductor section. For example, the bottom seat member may be rigidly connected to the flow conductor section 141 by a suitable coupling or collar 143 while the top seat member is secured to the top flow conductor section 140 by a suitable rotating union or swivel joint 145 which permits rotation of the top seat member relative to the top flow conductor.

The swivel joint may be of any suitable type. For example, it may include a stationary member 147 whose upper threaded end is secured to the top flow conductor section 140 by a suitable coupling collar 148 and whose lower end is rotatably disposed in the upwardly opening recess 150 of the rotatable lower member 151 threaded on the top end portion of the top seat member. The stationary union member has an external annular flange 152 which rests slidably on the annular surface 153 of the rotatable member. A suitable seal or gasket 155 is disposed in the recess above the flange and is compressed into sealing engagement by a nut 158 threaded in the upper end of the rotatable member 151. It will be apparent that the top seat member 102 may therefore be rotated about its longitudinal axis while the bottom seat member is held stationary due to its rigid connection with the bottom section 141 of the flow conductor.

The top seat member radially outwardly of and below its seat surface 124 is provided with three downwardly opening recesses 160a, 160b and 160c which are spaced substantially 120 degrees apart. The sides of the recess 160a are defined by the downwardly and outwardly divergently extending surfaces 161a and 161b. The sides of the recess 160b are defined by the similar downwardly and outwardly divergently extending surfaces 162a and 162b and the sides of the recess 160c are defined by the outwardly and downwardly divergently or extending surfaces 163a and 163b. The surfaces 164, 165, 166, defining the upper ends of the recesses 160a, 160b and 160c respectively, extend upwardly and inwardly at an angle of approximately 60 degrees from the vertical as do the surfaces 167, 168 and 169 of the top seat member between the recesses. The bottom seat member outwardly of its seat has an upwardly opening recess 170 which extends about approximately one-half of the circumference of the bottom seat member and which is de- outwardly and downwardly divergently or extending ing bottom surface 171 which slopes at an angle of approximately 60 degrees from the vertical, upwardly and outwardly divergently extending side surfaces 172a and 172b and arcuate surfaces 173a and 173b which extend from the lower ends of the side surfaces to the bottom surface. The side surface 172b extends upwardly to one end of a step 175 whose top surface 176 is spaced above a surface 177 which extends toward the step from the top end of the other side surface 172a. The top surface 176 of the step and the surface 177 are connected by a surface 178 which slopes downwardly from the step surface 176. The surfaces 176 and 177 slope upwardly and outwardly at an angle of approximately 60 degrees from the vertical.

The ball has a pair of large diameter actuator pins 180 and 181 which have a common axis coincident with a central axis Y—Y of the ball and a pair of small diameter pins 184 and 185 having a common axis coincident with a central axis Z—Z. The axes Y—Y and Z—Z extend at an angle of approximately 110 degrees relative to each other as viewed from above. The two axes preferably lie in a common plane which extends at an angle of approximately 45 degrees from the central axis L—L of the axial passage of the ball. The height of the step 175, i.e., the distance from the surface 177 to the surface 176, is preferably equal to the difference between the diameters of the large and small pins.

When the ball is in its open position illustrated in FIGURES 8, 9, 10 and 16 the pins 184 and 181 extend downwardly and outwardly from the ball at an angle of approximately 60 degrees from the vertical and the pins 180 and 184 extend outwardly and upwardly from the ball at an angle of approximately 60 degrees from the vertical. The small pin 184 and the large pin 181 are in their lowermost positions in the recess 170 and engage the surface 171 of the bottom seat member. The large pin 181 is also in engagement with the arcuate corner surface 173b. The small pin 185 is in the recess 160a and is engaged by the step surface 176 of the bottom seat member and the side surface 161b of the top seat member. The large pin 180 is in the recess 160b and engages the top surface 177 of the bottom seat member. The surface 161b also engages the side surface 178 of the step.

Figure 9:
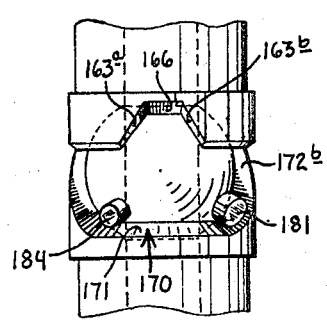
FIGURE 9 is a fragmentary side view of the ball and seat members of the valve of FIGURE 8 showing the ball in its open position.
Figure 12:
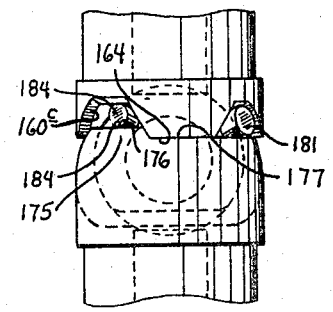
FIGURE 12 is a view similar to FIGURE 11 taken from the opposite side of the valve.
Figure 11:
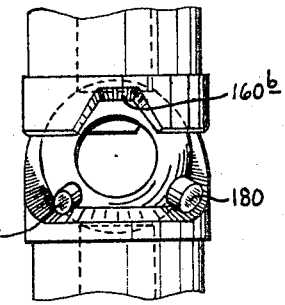
FIGURE 11 is a fragmentary side view of the ball and seat members of the valve of FIGURE 8 showing the ball in its closed position.

If the top seat member is now rotated in a clockwise direction as seen from above, the camming engagement of the side surfaces 161b and 178 of the two seat members causes a downward force to be imparted to the bottom seat member which moves downwardly against the resistance of the spring 128. At the same time, the engagement of the side surface 161b of the top seat member with the small pin 185 causes the ball to rotate relative to the bottom seat member in a clockwise direction as seen from above about the vertical longitudinal axis L—L of the ball until the small pin 184 contacts the arcuate corner surface 173a. At this time the pin 185 has been moved out of engagement with the top surface 176 of the stop and is free to move downwardly into the recess 170 of the bottom seat member and into engagement with the side surface 172b thereof. The bottom seat member however is held against upward movement by the engagement of the surface 167 of the top seat member with the top surface 176 of the step 175. The pin 180 is now held against vertical movement in either direction by its contact with the surfaces 177 and 165 of the bottom and top seat members. As the rotation of the top seat member is continued, the ball is rotated in a clockwise direction, as seen in FIGURE 9 about the axis Y—Y as the small pin 185 is moved downwardly due to its engagement with the shoulder 161b and the small pin 184 moves upwardly engaging the side surface 172a. When the pin 185 moves out of engagement with the surface 161b and into engagement with the side surface 172b, movement of the ball stops and the top seat member continues to rotate until the right hand surface 162b of the top seat member at its recess 160b engages the pin 180. Thereafter, the ball is rotated about the axis Y—Y as the axis Y—Y itself is rotated in a clockwise direction as seen from above as the pin 184 reaches the upper end of the surface 172a and the pin 185 engages the corner surface 172b. The recess 160c has moved into alignment with the pin 184 and receives the pin 184. At this time the pin 180, which has moved into engagement with the top surface 176 of the step 175 of the bottom member, moves out of engagement with the top surface 176 and the camming engagement of the shoulder 162b of the top seat member therewith imparts a downward force to the large pin 180 to cause it to move downwardly along the side surface 172b as the large pin 181 moves into engagement with the corner surface 173 and then moves upwardly along the side surface 172a. At the time the pin 180 is moved out of engagement with the step top surface, the bottom member is held against upward movement by the engagement of the surface 168 of the top seat member with the step top surface 176.

When the surface 162b moves out of engagement with the pin 180, the ball remains stationary as the rotation of the top seat member continues until the shoulder 163b of the top seat member engages the pin 184. The engagement of the side surface 163b with the pin 184 then causes rotation of the ball about the axis Z—Z, which is now being rotated about a vertical axis in a clockwise direction, as seen from above, the pin 180 moving downwardly along the side surface 172b and the pin 181 moving upwardly along the side surface 172a. During this movement of course the pin 185 moves in a clockwise direction, as seen from above, along the surface 171 and the pin 184 moves along the surface 177. As the ball is thus rotated toward and approaches its closed position illustrated in FIGURES 11 and 12, the pin 185 is moved over the step 175, the pin 180 is moved into the recess 160b. As the pin 180 is moved out of engagement with the top surface 176, the bottom seat member is moved upwardly by the spring 128 until its shoulder 177 engages the surface 169 of the top seat member and its step is extended into the recess 160c. As the large pin 181 moves out of engagement with the side surface 172a and into the recess 160a, the engagement of the shoulders 178 and 163b resists further rotation of the seat member. The provision of the stop therefor gives an indication to the operator when the ball reaches its fully closed position illustrated in FIGURES 11 and 12.

It will now be apparent that during this movement of the ball from its open to its closed position, the positions of the pins 180 and 181 have been reversed and also the positions of the pins 184 and 185.

Figure 10:
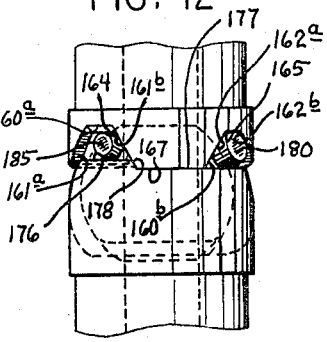
FIGURE 10 is a view similar to FIGURE 9 taken from the opposite side of the valve.
Figures 13, 14:
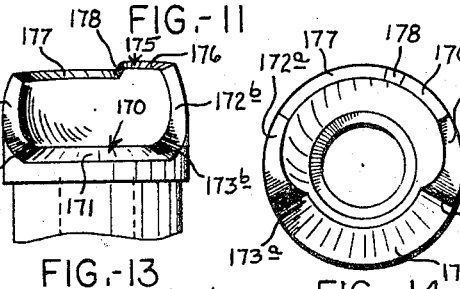
FIGURE 13 is a fragmentary side view of the bottom seat member of the valve of FIGURE 8.
FIGURE 14 is a top view of the bottom seat member of the valve of FIGURE 8.
Figure 15:
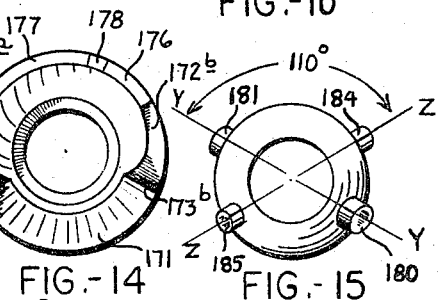
FIGURE 15 is an end view of the ball of the valve of FIGURE 8.
Figure 16:
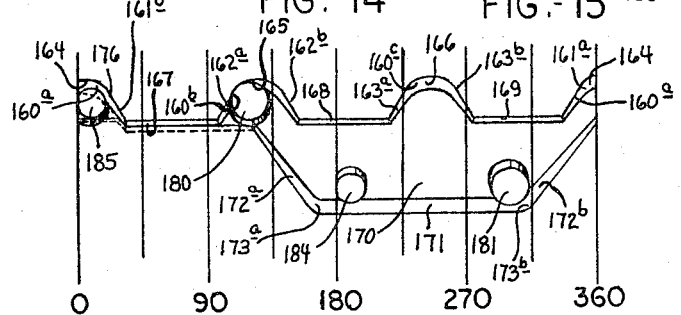
FIGURE 16 is a planar development of the seat members and ball of the valve of FIGURE 8 showing the positions of the seat members and the ball when the ball is in its open position.

If it is thereafter desired to open the valve again, a further clockwise rotation of the top seat member then causes the positions of the pins 181 and 180 and of the pins 184 and 185 to again be reversed to the positions illustrated in FIGURES 9 and 10, the ball first rotating about the axis Y—Y and then about the axis Z—Z during this opening movement of the ball and as the surface 161b of the top seat member again engages the stop shoulder 178, the increased resistance to the rotation of the top seat member will now give an indication to the operator that the ball is again in its open position.

It will be apparent that while the bottom seat member has been illustrated as being rigid and the top seat member as being rotatable, the bottom seat member could be rotatable and the top seat member would then be rigid and operation of the valve would be effected by counterclockwise rotation, as seen from above, of the bottom seat member. In fact, the valve may be operated by turning either of the seats relative to the other in either direction.

It will be further apparent that the valve is adapted for use in tubing being run into oil and gas wells for closing the lower portion of the tubing against flow from the well upwardly through the tubing. The valve, in such case, would be in the closed position during movement of the pipe into the well. When the depth at which the pipe is to be set in the well is reached, or the location in the well at which the valve is to be positioned is reached, the valve may be opened by rotating the upper portion of the tubing with respect to the lower portion. In this case, the lower portion of the tubing 141 below the valve 100 would be held stationary by suitable bow spring friction elements (not shown), secured fixedly to the tubing 141 below the valve. Such a bow spring assembly which could be fixedly secured to the tubing is illustrated in the Band W. Inc. tubing centralizers shown on page 347 of the 1960–61 Composite Catalog of Oil Field Equipment and Services, one of the sleeves of the centralizer being welded or otherwise fixedly secured to the tubing to prevent rotation of the tubing with respect thereto. In such case, the lower portion 141 of the tubing would be held stationary and the upper portion 140 of the tubing above the valve could be rotated to open and close the valve as desired.

It will now also be apparent that in the case of both of the illustrated and described valves, the force necessary to move the ball is minimized since the combined angle of its rotation about a plurality of different central axes thereof during its movement between its closed and open positions, which are displaced by ninety degrees, is considerably greater than ninety degrees, being approximately sixty-seven degrees about another axis.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve including: a pair of longitudinally aligned tubular seat members having flow passages therethrough and facing annular seat surfaces; a ball between said seat members and engageable with said seat surfaces, said ball having an axial passage therethrough; and operator means for moving said ball between an open position wherein said axial passage is in alignment and communication with said flow passages and a closed position wherein said axial passage is out of alignment and out of communication with said flow passages, the longitudinal axis of said axial passage when said ball is in one of said closed and open positions being displaced substantially 90 degrees from its position when said ball is in the other of said closed and open positions, said operator means including means rotatable about the longitudinal axis of said seat members for rotating said ball about more than one central axis thereof during its movement by said operator means between said open and closed positions.

2. The valve of claim 1 wherein said operator means includes means for moving the axes of rotation about which the ball is rotatable during the rotation of the ball about the axes.

3. The valve of claim 1, wherein said operator means includes cam means on said seat members and means rigid with said ball engageable with said cam means, one of said seat members being rotatable relative to the other of said seat members to cause rotation of said cam means of said seat members for causing movement of said ball between said open and closed positions.

4. The valve of claim 3, said seat members having means coengageable when said ball is in said open and closed positions releasably restraining rotation of one of said members relative to the other.

5. The valve of claim 4 wherein one of said seat members is movable away from the other of said seat members to permit disengagement of said coengageable means.

6. The valve of claim 1, wherein said operator means includes a tubular cam sleeve provided with a slot having vertically spaced top and bottom horizontal portions and an intermediate inclined portion extending between adjacent ends of said bottom and top portions, and a pair of actuator pins rigid with said ball and extending outwardly into said slot, said pins having axes angularly spaced at an angle of approximately 110 degrees from each other and coincident with central axes of said ball, said axes extending at an angle of approximately 30 degrees from the longitudinal axis of said axial passage, surfaces of said cam sleeve defining said slot engaging said pins to rotate the ball first about the axis of one of said pins and then about the axis of the other of said pins during rotation of said cam sleeve moving said ball between said open and closed positions.

7. The valve of claim 2 wherein said pins are disposed in one of said bottom and top portions of said slot when said ball is in one of said open and closed positions and are disposed in the other of said bottom and top portions when said ball is in the other of said open and closed positions.

8. The valve of claim 6, wherein each of said seat members has a pair of circumferentially spaced recesses in which said pins are receivable, said recesses providing stop shoulders limiting movement of said pins when said pins are disposed in said recesses and said ball is in said open and said closed positions.

9. The valve of claim 8, wherein each of said pins is held in a recess of one of said seat members while the other pin is in said intermediate portion of said slot and is being moved toward a recess of the other of said seat members whereby said ball is rotated first about the axis of one of said pins and then about the axis of the other of said pins during its movement between its open and closed positions.

10. The valve of claim 9 wherein said pins are disposed in one of said bottom and top portions of said slot when said ball is in one of said open and closed positions and are disposed in the other of said bottom and top portions when said ball is in the other of said open and closed positions.

11. The valve of claim 8 wherein said pins are disposed in one of said bottom and top portions of said slot when said ball is in one of said open and closed positions and are disposed in the other of said bottom and top portions when said ball is in the other of said open and closed positions.

12. A valve including: a tubular housing; a pair of longitudinally aligned tubular seat members having flow passages therethrough and facing annular seat surfaces, said seat members extending into said housing through opposite ends thereof; coengageable means for limiting movement of said seat members relative to said housing; a ball between said seat members and engageable with said seat surfaces, said ball having an axial passage therethrough; and operator means for moving said ball between an open position wherein said axial passage is in alignment and communication with said flow passages and a closed position wherein said axial passage is out of alignment and out of communication between said flow passages, the longitudinal axis of said axial passage when said ball is in one of said closed and open positions being displaced substantially ninety degrees from its position when said ball is in its other of said open and closed positions, said operator means including cam surfaces on said seat members and actuator means extending outwardly of said ball engageable by said cam surfaces, said operator means rotating said ball about more than one central axis thereof between said open and closed positions upon predetermined rotation of one of said seat members relative to the other.

13. The valve of claim 12, wherein one of said seat members has three circumferentially spaced recesses opening toward the other of said seat members, each of said recesses providing outwardly divergent side cam surfaces extending divergently toward said other of said seat members, said other of said seat members having an upwardly facing recess having outwardly divergent side surfaces extending divergently through said one of said seat members, said actuator means including a pair of lower actuator pins and a pair of upper actuator pins, the lower actuator pins extending downwardly and outwardly at an angle of approximately sixty degrees from the central axis of said axial passage and the upper pins extending upwardly and outwardly at an angle of approximately sixty degrees from the central axis of said axial passage, oppositely extending lower and upper pins having common axes, said axes extending at an angle of approximately one hundred ten degrees relative to each other, said ball being rotatable first about one of said axes and then about the other during movement of said ball between its open and closed positions.

14. The valve of claim 13, wherein said valve has means biasing one of said seat members toward the other.

15. The valve of claim 14 wherein said seat members have means coengageable with said ball is in said open and closed positions for releasably limiting rotation of one seat member relative to the other, said coengageable means moving said one of said seats against the resistance of said biasing means upon the application of a predetermined force tending to rotate one seat member relative to the other to disengage said coengageable means.

16. In combination with a well tubing adapted to be run into a well bore and held against rotation therein a valve connected in said tubing, said valve including: a tubular housing; a pair of longitudinally aligned tubular seat members each having a flow passage therethrough and facing annular seat surfaces, said seat members extending into said housing through opposite ends thereof and having means at their opposite outer ends for connection of said seat members in said tubing string; co-engageable means for limiting longitudinal movement of said seat members relative to said housing; a ball closure member between said seat members engageable with said seat surfaces, said ball having a diametrical axial passage therethrough; an operator means for moving said ball between an open position wherein said axial passage is in alignment and communication with said flow passages of said seat members and a closed position wherein said axial passage is out of alignment and out of communication with said flow passages of said seat members, the longitudinal axis of said diametrical axial passage when said ball is in one of said closed and open positions being displaced substantially ninety degrees from its position when the ball is in its other of said open and closed positions; said operator means including cam surfaces on said seat members, and actuator means extending outwardly of said ball engageable by said cam surfaces, said operator means rotating said ball about more than one central axis thereof between said open and closed positions upon predetermined rotation of one of said seat members about its longitudinal axis relative to the other by means of the tubing string connected thereto.

References Cited
UNITED STATES PATENTS

| | | | |
|---|---|---|---|
| 2,849,207 | 8/1958 | Conrad | 251—251 X |
| 2,991,090 | 7/1961 | Cenzo | 251—340 X |
| 3,126,908 | 3/1964 | Dickens | 137—460 |

WILLIAM F. O'DEA, *Primary Examiner.*

D. R. MATTHEWS, *Assistant Examiner.*